United States Patent [19]

Fisher et al.

[11] Patent Number: 5,246,725
[45] Date of Patent: Sep. 21, 1993

[54] SPOONABLE FROZEN FOOD PRODUCT

[75] Inventors: Thelma L. Fisher, Chicago; Sumner N. Katz, Norwood Park Township, both of Ill.

[73] Assignee: Tish's Italian Specialties, Inc., Chicago, Ill.

[21] Appl. No.: 829,422

[22] Filed: Feb. 3, 1992

[51] Int. Cl.$^5$ .............................................. A23G 9/00
[52] U.S. Cl. .................................. 426/565; 426/566; 426/567; 426/804
[58] Field of Search ................ 426/565, 566, 567, 804

[56] References Cited

U.S. PATENT DOCUMENTS

| | | | |
|---|---|---|---|
| 3,647,472 | 3/1972 | Speech et al. | 426/565 |
| 3,826,829 | 7/1974 | Marulich | 426/565 |
| 4,626,441 | 12/1986 | Wolkstein | 426/565 |
| 4,826,656 | 5/1989 | Huber et al. | 426/565 |
| 4,857,352 | 8/1989 | Miller et al. | 426/565 |
| 4,927,654 | 5/1990 | Barnett et al. | 426/565 |
| 4,971,824 | 11/1990 | Jonas | 426/565 |
| 5,000,974 | 3/1991 | Albersmann | 426/565 |
| 5,051,271 | 9/1991 | Ivengar et al. | 426/565 |

OTHER PUBLICATIONS

Photocopy of package of Welch's package for Fruit Juice Bars.
Photocopy of Popsicle Ice Pops package.

*Primary Examiner*—Jeanette Hunter
*Attorney, Agent, or Firm*—Emrich & Dithmar

[57] ABSTRACT

A low-fat frozen ice product spoonable at temperatures in excess of 4° F., and method of making same. The product includes a sugar alcohol such as sorbitol, mannitol or xylitol present in the range of from about 5.5% to about 9.5% by weight, and glycerine present in the range of from about 0.85% to about 2.0% by weight. A gelling agent such as pectin, agar-agar, gelatin, carrageenan, alginates, gum arabic or gum tragacanth is present in the range of from about 0.5% to about 1.15% by weight, and a bulking agent such as maltodextrin, corn syrup solids, polydextrose, xanthan gums, locust bean gum or CMC is present in the range of from about 3% to about 10% by weight. A synthetic sweetener such as aspartame, thaumatin, acesulfame K, glycyrrhizin, sweetinin, saccharin, chalcone, miracin, sucralose and stevioside is present in the range of from about 0.03% to about 0.1% by weight, with suitable flavors, colorants, fruit acidulants (optional) and preservatives. The balance is water.

27 Claims, No Drawings

SPOONABLE FROZEN FOOD PRODUCT

BACKGROUND OF THE INVENTION

This invention relates to low-fat and sugar-free frozen ice desserts which are spoonable at temperatures in excess of 4° F. The frozen dessert products of the invention have low caloric content because the sugar normally present in their non-dietetic counterparts has been replaced by a sufficient amount of a synthetic sweetener such as aspartame (L-aspartyl-L-phenylalanine methyl ester). Typical of frozen low-fat water-based ice products contemplated in this invention are sorbets and sherbets and most particularly, water ices. The frozen ice products of the invention are spoonable at temperatures in excess of 4° F. The term "spoonable" herein means that the product is spoonable with a plastic spoon.

Home freezers typically have low temperatures of about 10° F. to −5° F. Thus, it may be necessary, when removing from a home freezer a frozen food product incorporating the features of the present invention, to allow it to warm to 4° F. before it is spoonable. The inventive product is to be distinguished from those quiescently frozen novelties, frequently packaged on a stick which are not intended to be eaten with a spoon, are not considered spoonable within the definition of this invention.

There are a number of problems which are encountered when preparing low-fat and low-calorie frozen spoonable products. U.S. Pat. No. 4,626,441 to Wolkstein alludes to some of these problems and particularly the difficulty in replacing bulk when sugar is substituted with aspartame which is about 200 times sweeter than sugar. Because the volume of aspartame used in the formula is much less than the corresponding volume of sugar, the product has inferior structure and mouthfeel. Wolkstein uses, in addition to a synthetic sweetener such as aspartame, sucrose polyester as artificial fat substitutes. Only example 13 of the Wolkstein patents discusses water ice product which does not include milk or milk fat ingredients.

U.S. Pat. No. 4,826,656 to Huber et al. discloses a soft frozen water ice which is smooth textured and is of the type which may be dispensed similar to frozen yogurt or soft-serve ice cream and includes natural sugars along with thickening agents, flavoring agents, bulking agents and the like. The Huber et al. patent discloses a water ice product which has a sweetening agent such as sucrose or fructose or corn syrup solids in the range of between about 20 and 24% by weight of the product. There is no disclosure in the Huber et al. patent of how to accommodate the formula there disclosed if all of the actual sugars which make up 20-24 weight percent of the product were to be substituted with the synthetic sweeteners also disclosed therein.

Because of increased attention given to controlling caloric intake in the diet, dietetic or low-calorie frozen desserts with synthetic sweeteners are a desirable product and in addition, because of the increased awareness of the public to the possible deleterious effects of fat in foods, a low-fat as well as a low-calorie product is of heightened interest.

SUMMARY OF THE INVENTION

This invention provides a low-fat and sugar-free frozen dessert which is water-based, categorized as an "Italian ice," that is spoonable at temperatures of 4° F. and higher. This product is intended to be sold in containers from individual serving sizes up to a gallon at the retail level and larger containers at the wholesale level. The product is intended to be dished out in a manner similar to that of ice cream or frozen yogurt and in its most preferred form, has a typical overrun of about 20% compared to ice cream which could have an overrun as high as 100%.

Accordingly, a principal object of the invention is to provide a frozen water ice product which is fat free or low-fat and sugar-free and is spoonable at 4° F. and above.

Another object of the invention is to provide a frozen water ice product containing no sugar which has a creamier and smoother texture than the normally grainy water ice frozen confectioneries, the superior mouthfeel, texture and spoonability of the invention product being attributable to the novel combination of five ingredients including a sugar alcohol, glycerin, a gelling agent, a bulking agent and a synthetic sweetener, as will be explained.

In summary, there is provided a fat free or low-fat frozen ice product spoonable at temperatures in excess of 4° F., comprising a sugar alcohol present in the range of from about 5.5% to about 9.5% by weight, glycerine present in the range of from about 0.85% to about 2.0% by weight, a gelling agent present in the range of from about 0.5% to about 1.15% by weight, a bulking agent present in the range of from about 3% to about 10% by weight, a synthetic sweetener present in the range of from about 0.03% to about 0.1% by weight, and the balance water.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

The spoonable fat free or low-fat and sugar-free frozen ice product is a combination of five basic ingredients in addition to flavoring agents, preservatives, colorants and in cases where the flavor is a fruit flavor, a fruit acidulant. The five ingredients of the invention are a sugar alcohol, a gelling agent, a bulking agent, glycerin and a synthetic sweetener. These five ingredients must be present and present in the ratios hereinafter discussed for the product to be an acceptable commercial product and fulfill the requirements of being spoonable at temperatures of 4° F. and above.

The term "sugar alcohol," as used herein, means sorbitol, mannitol, xylitol and equivalents. The purpose of the sugar alcohol is a source of non-nutritive sweetness that is a substitute for sugar and which also contributes to the solid content of the product. The sugar alcohol should be present in the range of from about 5.5% by weight to about 9.5% by weight. Sorbitol is the preferred sugar alcohol and the preferred concentration is about 9%. If too much sugar alcohol is added, the product may be too sweet and the solid contents of the product be too high which precludes or adversely affects the spoonability thereof at the specified temperature. If too little sugar alcohol is used the product is likely to be not sweet enough and physically the product will have a tendency to be too slushy.

Glycerin is present in the range of from about 0.85% by weight to about 2.0% by weight, with the preferred concentration being about 1%. Glycerin acts as a texturizing agent to lower the freezing point of the product in order for the product to be spoonable at the required temperature of about 4° F. and above. If too much glycerin is present, the product will not freeze properly and if too little glycerin is present the product will freeze too hard to be spoonable.

The gelling agent is preferably pectin in the range of about 0.5% to about 1.15%, with the preferred concentration being about 0.6%, but other agents may be substituted therefor. Suitable alternatives for pectin are agar-agar, gelatin, carrageenin, sodium alginates, gum arabic and gum tragacanth. The purpose of the gelling agent is to provide suitable texture or viscosity to the product. If too much gelling agent is used, the product will agglomerate and form a hard gel or form a gelatin that will not freeze. If too little gelling agent is used, the gelling agent will not hold the other ingredients in a proper homogeneous mixture and the product will freeze too hard.

The bulking agent is preferably maltodextrin and should be present in a range of from about 3% by weight to about 10% by weight and having a DE (dextrose equivalent) of about 10-18. About 4% by weight is preferred with a DE of about 15. Acceptable alternatives for the maltodextrin bulking agent are hydrolyzed cereal solids, polydextrose, xanthan gum, locust bean gum, guar gum and sodium carboxymethylcellulose ("CMC") where the product is sugar free. If the product is permitted to have some sugar then corn syrup solids may be substituted for some or all of the preferred maltodextrin.

A synthetic sweetener is preferably aspartame and is present in the range of from about 0.03 to about 0.1% by weight with about 0.08% being preferred. Acceptable alternatives to aspartame are thaumatin, acesulfame K, glycyrrhizin, sweetinin, saccharin, chalcone, miracin, sucralose and stevioside. It is understood that the synthetic sweetener must be FDA approved and at the present time, the FDA approved synthetic sweeteners are aspartame, acesulfame K, glycyrrhizin and saccharin. The aspartame is present to sweeten the product. If too much or too little is used the product will either be too sweet or not sweet enough.

The flavoring agents may be any natural or artificial flavor desired and may range from a fruit flavor such as peach, coconut, cherry, strawberry, blueberry, pineapple, orange, banana and blends thereof to more exotic flavors such as passionfruit or bubblegum. Chocolate is also a preferred flavor. The fruit flavor is generally present in an amount from about 0.01 to about 1% by weight for artificial flavors. Natural flavors may require slightly more. In some flavor selections, it is desired to enhance the tartness of the flavor and in those cases, a fruit acidulant such as citric acid, malic acid or tartaric acid may be added to the composition generally in the range of from about 0.1 to about 1-5%. For instance, the preferred fruit acidulant is a citric acid in an amount for a lemon flavored low-fat, sugar-free ice of about 0.9% by weight. The concentration of fruit acidulant present depends on taste.

It is also within the scope of the invention to fortify the composition with the vitamins and/or minerals to provide an overall blend that will supply some or all of the U.S. RDA of selected vitamins and/or minerals on a per serving basis. For instance, absorbic acid may be added in minor quantities such as 0.001 to 0.002% by weight to support a vitamin C claim. Preservatives are also included and the preferred preservative is sodium benzoate but acceptable alternatives are potassium sorbate, sorbic acid and BHA or other well known and FDA acceptable preservatives. The preservatives are present in minute quantities sufficient to accomplish their well known purpose.

Colorants may also be added either as natural or artificial. Natural colorants such as Enocianina (grape extract), beet juice color, red cabbage color, carmine red (cochineal) color or combinations thereof are acceptable. Turmeric concentrate is also used. Artificial coloring such as FD&C approved food color based on Red #40 alone or in combination with Yellow #5, Yellow #6 or Blue #1 may also be used.

In general, the fruit flavors having fruit acidulants will provide a product which has a pH of less than 3 and preferably, for instance, for a lemon flavor, a pH of 2.55 and in the case of a strawberry flavor a pH of about 2.85. Where fruit acidulants are not present such as for fruits like banana or flavors like chocolate, the pH of the product will be in the range of from about 4 to about 6. The solid content of the product is clearly a matter of choice, but it is preferred that the solids content be about 13% with an overrun of about 20%-30%. The overrun may vary depending upon the desired intensity of the product.

In the process of making the invention, a 12 cubic foot mixer was employed and mounted in such a way as to deposit its contents directly into a 150 gallon capacity steam-jacketed kettle containing water, initially at 50°-65° F. For purposes of explanation only, without limiting the scope of the invention, the process will be described with the use of powdered pectin, sorbitol and maltodextrin. The pectin, fruit acidulants and powder preservatives are added as powders into the ribbon mixer, mixed well and dumped into the water which is then heated to a temperature in the range of about 160° F. to about 180° F. and held at this elevated temperature for about 10 minutes in order to permit the pectin to swell. After this period of time, the heat to the kettle is turned off and the mixture is allowed to cool to a temperature in the range of from about 100° to about 110° F. At this range, the desired fruit juice, flavoring and color are added into the tank and agitated until all is uniformly distributed. This material is then a flavor concentrate to be used as hereinafter set forth.

In the final mixing and preparation of the invention, six 300 gallon mixing tanks are arranged in pairs, the output of each tank being connected to the associated barrel of a 3-barrel freezer. The freezer outlets are coupled to filling valves after the containers are filled, the lids are applied and they are packaged and delivered to a storage freezer maintained at −20° F. Each mixing tank is provided with an agitator mounted at the top, the impeller of which is near the bottom of the tank via an overhead piping system, 206.5 gallons of water are delivered to the tank. The impeller is turned on as the ingredients are added. For a batch of material, 1.77 pounds of aspartame are added in powdered form followed by 100 pounds of maltodextrin, 198.03 pounds of powdered sorbitol followed by 22.3 pounds of glycerin followed by 19.1 gallons of the flavor concentrate previously described. The aspartame, maltodextrin, sorbitol and glycerin are added as powders which are mixed for at least 10 minutes and usually about 45 minutes until all the powders are dissolved in the tanks. If natural fruit, puree or juices are used, they are added preferably after the powders have been solubilized. The mixture is then pumped into the associated barrel of the freezer. The barrel has a much smaller volume than any of the associated tanks and is filled starting from the rear. Because the barrels are encased in ammonia the water-based material begins to freeze. Inside the barrel is a set of dashing blades, which scrape freezing material off the inner surface of the barrel. A gauge associated with each barrel displays the load on the blades. When the load reaches a predetermined value, easily ascertained by those skilled in the art, the product which is sufficiently frozen, is removed. The material starts out as a liquid at the rear of the barrel but by the time it reaches the front of the barrel it is frozen sufficiently to be pumped to the filling equipment.

Batches of lemon water ice, having about 253–254 gallons per batch have been produced while batches of strawberry of about 268 to 270 gallons have been produced in the aforesaid manner. Air is delivered to the line connecting the mixing tanks to the associated freezing barrel. The amount of air introduced determines the volume of the product, and is referred to as "overrun." In general, it is believed that the product should have an overrun of between 20 and 30%, the lemon flavored overrun being approximately 20% while the overrun of the strawberry is approximately 30%. It is understood that the solids content which is about 13% may be varied. In general, the higher the solids content, the more air can be introduced into the product, producing a higher overrun. Conversely, the lower the solids content the lower the overrun can be.

The pH of the product will depend upon the presence of acidulants. For fruit flavors, acidulants are usually added. When fruit acidulants are present the pH is almost always less than 3. For instance, the lemon product preferably has a pH of 2.55 while the strawberry flavored product has a pH of about 2.85. Flavors like banana or chocolate where no acidulant is present will have a pH in the range of about 4 to 6.

Production of the frozen water ice may also be accomplished by a continuous batch process so that the previously described flavor concentrate may not be made as an intermediate product. For a continuous process, a 12 cubic foot ribbon mixture may be used to mix the powdered pectin and fruit acidulants which are added first and mixed from 1 to 2 minutes, followed by the addition of powdered sorbitol, maltodextrin and the selected preservatives such as sodium benzoate and/or potassium sorbate. This mixture is slowly deposited into a steam-jacketed 150 gallon kettle holding cold water (50° F.–65° F.). This water is then heated to a temperature in the range of 160° F. to 180° F. and held for 10 to 15 minutes to permit the pectin to swell. The mixture is then agitated to ensure uniform composition and consistency. The blended mixture is then cooled to a temperature range of 100° F. to 110° F. in a separate holding tank. When this temperature is reached, the glycerin, flavor, color and juice are introduced thereinto and mixed. Just prior to pumping the mixture into the batch freezer, the aspartame is introduced into the mixture and agitated. Thereafter, this batch mixture is added into the freezer or alternatively a quantity of water may have been held in the freezer and this material added therein and mixed by the impeller as previously described such that the product is frozen as hereinbefore set forth.

Hereinafter set forth are a series of formulations for lemon, strawberry, chocolate, fat free or low-fat and non-sugar sorbet. The sorbitol used was provided by the Roquette Corporation under the trade name Neosorb ® 70/20 USP solution. The solution had a specific gravity of 1.285 and a refractive index at 20° C. of 1.4565 to 1.4585. The solution contained 30% by weight water and had a total sugar content of 2.5% maximum and a total sorbitol content of 64.0% minimum. The maltodextrin is purchased under the trade name Maltrin ® M100 which is a trademark of the Grain Processing Corporation of Muscatene, Iowa. Maltrin ® brand M100 Maltodextrin is a 10 DE bland, low sweetness white carbohydrate powder. It is readily dispersable and completely soluble in water. The standard specifications are DE equivalent of 9–12, a moisture content of 6% and a pH, 20% solution in the range of from 4 to about 4.7. A typical carbohydrate profile on a dry basis for maltodextrin is monosaccharides 0.5%, disaccharides 2.7%, trisaccharides 4.3%, tetrasaccharides 3.7% and pentasaccharides and above 88.8%. The glycerin used is USP grade glycerin which is essentially an odorless liquid having a specific gravity greater than about 1.24 containing less than 1.0 ppm chloride, less than 5.0 ppm chlorinated compounds, less than 2.0 meq/100 g fatty acids and esters and less than 5 ppm heavy metals. The material is purchased from the Avatar Corporation.

| Formula for Artificially Sweetened Lemon Flavored Frozen Water Ice (In Percent) | | | | |
| --- | --- | --- | --- | --- |
| | A | B | C | D |
| Sorbitol | 7.000 | 8.000 | 7.000 | 9.000 |
| Maltodextrin 15 D.E. | 4.000 | 4.000 | 4.000 | 4.400 |
| Glycerine | 1.000 | 1.000 | 1.000 | 1.000 |
| Aspartame | 0.080 | 0.070 | 0.075 | 0.075 |
| Pectin | 1.000 | 0.800 | 0.700 | 0.600 |
| Citric Acid | 1.300 | 1.170 | 1.040 | 0.990 |
| Ascorbic Acid | — | — | 0.020 | 0.020 |
| Sodium Benzoate | — | 0.100 | 0.100 | — |
| K Sorbate | — | 0.100 | 0.100 | — |
| 1% Turmeric Conc. | — | — | 0.040 | 0.040 |
| Lemon Flavor | 0.750 | 0.730 | 0.310 | 0.110 |
| Lemon Juice Powder | — | — | — | 0.240 |
| Lemon Juice | 1.600 | 1.680 | 1.500 | — |
| Lemon Juice Crystals | — | — | 0.080 | — |
| Water | 83.270 | 82.350 | 84.035 | 83.525 |
| Total | 100.000 | 100.000 | 100.000 | 100.000 |

| Formula for Artificially Sweetened Strawberry Flavored Frozen Ice (In Percent) | | | | | |
| --- | --- | --- | --- | --- | --- |
| | A | B | C | D | E |
| Sorbitol | 8.00 | 7.00 | 8.00 | 9.00 | 8.00 |
| Maltodextrin 15 D.E. | 3.00 | 4.00 | 4.40 | 4.00 | 4.00 |
| Glycerine | 1.00 | 1.00 | 1.00 | 0.80 | 1.00 |
| Pectin | 1.00 | 1.00 | 0.50 | 0.80 | 1.00 |
| Aspartame | 0.08 | 0.08 | 0.08 | 0.07 | 0.08 |
| Malic Acid | 0.60 | 0.50 | 0.70 | 0.60 | 0.70 |
| Ascorbic Acid | — | — | 0.02 | 0.02 | 0.02 |
| Flavor | 0.06 | 0.05 | 0.05 | 0.05 | 0.05 |
| Sodium Benzoate | — | — | — | 0.10 | 0.10 |
| K Sorbate | — | — | — | 0.10 | 0.10 |
| Strawberry Juice Conc. 65 Brix | 0.85 | 0.85 | 0.28 | 0.60 | 0.50 |
| Cochineal Color | 0.12 | 0.12 | — | — | — |
| 1% Red #40 | — | — | 0.23 | 0.25 | 0.23 |
| Water | 85.29 | 85.40 | 86.64 | 83.61 | 84.22 |
| Total | 100.00 | 100.00 | 100.00 | 100.00 | 100.00 |

| Formula for Chocolate Artificially Sweetened Spoonable Water Ice (In Percent) | | | |
| --- | --- | --- | --- |
| | A | B | C |
| Sorbitol | 7.00 | 8.00 | 9.00 |
| Maltodextrin 15 D.E. | 4.00 | 4.00 | 4.40 |

-continued

|  | | | |
|---|---|---|---|
| Aspartame | 0.08 | 0.07 | 0.07 |
| Cocoa (10–12%) Or Defatted (1%) | 2.40 | 2.40 | 2.65 |
| Vanilla Extract Single Fold | 1.00 | 1.25 | 1.35 |
| Pectin | 0.50 | 0.50 | 0.50 |
| Glycerine | 1.00 | 1.00 | 1.00 |
| Water | 84.02 | 83.28 | 81.43 |
| Total | 100.00 | 100.00 | 100.00 |

While there have been disclosed what is considered to be the preferred embodiments of the present invention, it is understood that various changes in the details may be made without departing from the spirit, or sacrificing any of the advantages of the present invention.

What is claimed is:

1. A low-fat frozen ice product spoonable at temperatures in excess of 4° F. comprising a sugar alcohol present in the range of from about 5.5% to about 9.5% by weight, glycerine present in the range of from about 0.85% to about 2.0% by weight, a gelling agent present in the range of from about 0.5% to about 1.15% by weight, a bulking agent present in the range of from about 3% to about 10% by weight, a synthetic sweetener present in the range of from about 0.03% to about 0.1% by weight, and the balance water.

2. The product of claim 1, wherein the sugar alcohol is one or more of sorbitol, mannitol and xylitol.

3. The product of claim 1, wherein the gelling agent is one or more of pectin, agar-agar, gelatin, carrageenan, alginates, gum arabic and gum tragacanth.

4. The product of claim 1, wherein the bulking agent is one or more of maltodextrin, hydrolyzed cereal solids, corn syrup solids, polydextrose, xanthan gums, locust bean gum and CMC.

5. The product of claim 4, wherein the bulking agent has a DE of between about 10 and about 18.

6. The product of claim 1, wherein the pH of the product is in the range of from about 2 to about 3.

7. The product of claim 1, wherein the synthetic sweetener is one or more of aspartame, thaumatin, acesulfame K, glycyrrhizin, sweetining saccharin, chalcone, miracin, sucralose and stevioside.

8. The product of claim 7, wherein the synthetic sweetener is FDA approved.

9. The product of claim 8, wherein the synthetic sweetener is one or more of aspartame, acesulfame K, glycyrrhizin and saccharin.

10. The product of claim 1, wherein the solids content has a brix value in the range of from about 12 to about 14.

11. The product of claim 10, wherein the product has an overrun of about 20%.

12. The product of claim 1, wherein the product is sugar-free.

13. A low-fat frozen ice product spoonable at temperatures in excess of 4° F. comprising about 9% by weight of one or more of sorbitol, mannitol and xylitol, about 1% by weight of glycerine, about 4.5% by weight of a bulking agent having a DE in the range of from about 10 to about 18, about 0.6% by weight of a gelling agent, a FDA approved synthetic sweetener present in the range of from about 0.06 to about 0.1% by weight, suitable flavors, colorants, preservatives and the balance water.

14. The product of claim 13, wherein sorbitol is used alone and the bulking agent is maltodextrin.

15. The product of claim 14, wherein the maltodextrin has a DE of about 15 and the synthetic sweetener is predominantly aspartame or aspartame alone.

16. The product of claim 15, wherein the flavor is a fruit flavor and further including a fruit acidulant of one or more of citric acid, malic acid, fumaric acid or tartaric acid.

17. The product of claim 16, wherein the fruit is selected from one or more of lemon, lime, orange, peach, apricot, blueberry, raspberry, blackberry, pineapple, passion, guava, and grapefruit.

18. The product of claim 16, wherein the fruit is lemon or strawberry and the pH is below 3.

19. The product of claim 16, and further including ascorbic acid.

20. The product of claim 15, wherein the flavor is chocolate or banana and the pH is between about 4 and about 6.

21. The product of claim 13, wherein the preservatives are one or more of sodium benzoate, potassium sorbate, sorbic acid or BHA.

22. A low-fat frozen ice product spoonable at temperatures in excess of 4° F. comprising sorbitol present in the range of from about 5.5 to about 9.5% by weight, glycerine present in the range of from about 0.85% to about 1.15% by weight, pectin present in the range of from about 0.5% to about 1.15% by weight, maltodextrin present in the range of from about 3% to about 10% by weight, aspartame present in the range of from about 0.03% to about 0.1% by weight, suitable flavors, colorants, preservatives, and the balance water.

23. The product of claim 22, wherein the sorbitol is present in an amount of about 9% by weight, the glycerine is present in an amount of about 1% by weight, the pectin is present in an amount of about 0.6% by weight, the maltodextrin is present in an amount of about 4 to about 5% by weight, the aspartame is present in an amount of about 0.08% by weight.

24. The product of claim 23, wherein the flavor is a fruit and further including citric acid present in the range of from about 0.5% to about 1.3% by weight, the pH being less than about 3.

25. The product of claim 24, wherein the flavor is predominately lemon or lemon alone, the citric acid is present in the amount of about 1% by weight and the brix is about 13%.

26. The product of claim 24, wherein the flavor is strawberry, the citric acid is present in the amount of about 0.5% by weight and the brix is about 13%.

27. The product of claim 23, wherein the flavor is chocolate.

* * * * *

UNITED STATES PATENT AND TRADEMARK OFFICE
CERTIFICATE OF CORRECTION

PATENT NO. : 5,246,725
DATED : September 21, 1993
INVENTOR(S) : Thelma L. Fisher and Sumner N. Katz It is certified that error appears in the above-indentified patent and that said Letters Patent is hereby corrected as shown below:

TITLE PAGE

[73] "Tish's Italian Specialties, Inc.," should be --Mama Tish's Italian Specialties, Inc.,--.

[57] In the abstract, line 2, after "same" insert --are disclosed--.

Column 7, line 43, "sweetining" should be --sweetinin--.

Signed and Sealed this

Eighth Day of March, 1994

Attest:

BRUCE LEHMAN

Attesting Officer     Commissioner of Patents and Trademarks